(12) United States Patent
Shimizu

(10) Patent No.: US 9,055,175 B2
(45) Date of Patent: Jun. 9, 2015

(54) IMAGE READING APPARATUS, AND IMAGE FORMING APPARATUS

(71) Applicant: FUJI XEROX CO., LTD., Tokyo (JP)

(72) Inventor: Kosuke Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/193,336

(22) Filed: Feb. 28, 2014

(65) Prior Publication Data

US 2015/0022868 A1 Jan. 22, 2015

(30) Foreign Application Priority Data

Jul. 18, 2013 (JP) ................................. 2013-149345

(51) Int. Cl.
| | |
|---|---|
| *H04N 1/04* | (2006.01) |
| *H04N 1/00* | (2006.01) |
| *H04N 1/028* | (2006.01) |
| *H04N 1/12* | (2006.01) |
| *H04N 1/193* | (2006.01) |
| *H04N 1/409* | (2006.01) |

(52) U.S. Cl.
CPC ....... *H04N 1/00909* (2013.01); *H04N 1/02815* (2013.01); *H04N 1/125* (2013.01); *H04N 1/193* (2013.01); *H04N 1/4097* (2013.01); *H04N 2201/0081* (2013.01)

(58) Field of Classification Search
CPC ..... H04N 1/1215; H04N 1/192; H04N 1/193; H04N 1/4097; H04N 2201/02497; H04N 2201/044; H04N 2201/0446; H04N 5/7425; G01J 1/0271; G01J 1/04; G01J 1/0403; G01J 1/0414; G01J 1/044; G01J 1/08
See application file for complete search history.

(56) References Cited

U.S. PATENT DOCUMENTS

| | | | | |
|---|---|---|---|---|
| 7,006,705 | B2 * | 2/2006 | Takayama et al. | 382/275 |
| 7,675,656 | B2 * | 3/2010 | Ishiguro et al. | 358/514 |
| 7,889,393 | B2 * | 2/2011 | Yoshizawa | 358/3.01 |
| 8,018,631 | B2 * | 9/2011 | Kagami | 358/486 |
| 8,274,673 | B2 * | 9/2012 | Okumura et al. | 358/1.13 |
| 8,320,029 | B2 * | 11/2012 | Kamei | 358/488 |

(Continued)

FOREIGN PATENT DOCUMENTS

| | | |
|---|---|---|
| JP | A-2005-064913 | 3/2005 |
| JP | A-2008-147816 | 6/2008 |

(Continued)

OTHER PUBLICATIONS

Translation of Nov. 5, 2013 Japanese Office Action issued in Japanese Application No. 2013-149345.

*Primary Examiner* — Negussie Worku
(74) *Attorney, Agent, or Firm* — Oliff PLC

(57) ABSTRACT

Provided is an image reading apparatus including a light source that irradiates an original document that passes through a reading position with light, a light receiving unit that receives reflected light from the original document, a background member that is inclined at an angle where a difference between an incident angle of the light from the light source and a reflection angle of the light to the light receiving unit is smaller than a difference therebetween on the original document present at the reading position, with the original document at the reading position interposed between the background member and the light source, and a foreign substance detecting section that detects, when the original document is not present at the reading position, a foreign substance present at the reading position.

9 Claims, 10 Drawing Sheets

(56) References Cited

U.S. PATENT DOCUMENTS

| | | | |
|---|---|---|---|
| 8,520,271 B2 * | 8/2013 | Nishio | 358/475 |
| 8,681,386 B2 * | 3/2014 | Shimatani | 358/3.26 |
| 8,743,431 B2 * | 6/2014 | Hayasaka et al. | 358/498 |
| 8,749,860 B2 * | 6/2014 | Arima | 358/520 |
| 8,837,018 B2 * | 9/2014 | Matsui | 358/498 |
| 8,867,107 B1 * | 10/2014 | Shimizu | 358/474 |
| 8,873,846 B2 * | 10/2014 | Jin | 382/165 |
| 2008/0137107 A1 | 6/2008 | Futami | |

FOREIGN PATENT DOCUMENTS

| | | |
|---|---|---|
| JP | A-2012-039316 | 2/2012 |
| JP | A-2012-244383 | 12/2012 |

* cited by examiner

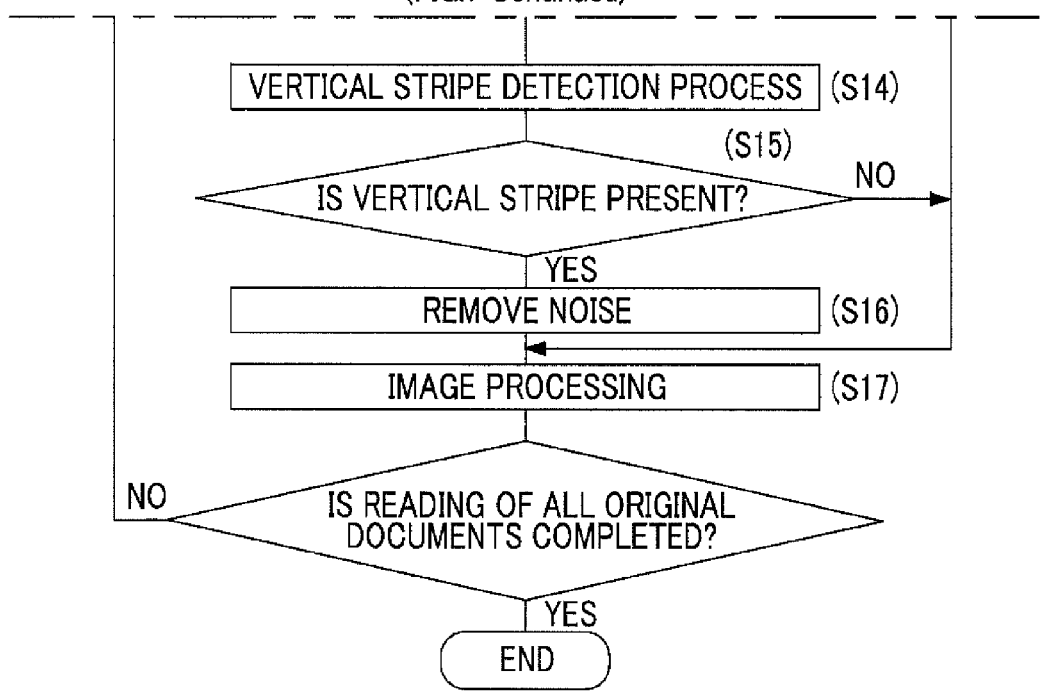

IMAGE READING APPARATUS, AND IMAGE FORMING APPARATUS

CROSS-REFERENCE TO RELATED APPLICATIONS

This application is based on and claims priority under 35 USC 119 from Japanese Patent Application No. 2013-149345 filed Jul. 18, 2013.

BACKGROUND

Technical Field

The present invention relates to an image reading apparatus, and an image forming apparatus.

SUMMARY

According to an aspect of the invention, there is provided an image reading apparatus including:

a light source that irradiates an original document that passes through a reading position with light;

a light receiving unit that receives reflected light from the original document;

a background member that is inclined at an angle where a difference between an incident angle of the light from the light source and a reflection angle of the light to the light receiving unit is smaller than a difference therebetween on the original document present at the reading position, with the original document at the reading position interposed between the background member and the light source; and a foreign substance detecting section that detects, when the original document is not present at the reading position, a foreign substance present at the reading position based on a result obtained by irradiating the background member with light having a light intensity lower than the intensity of the light for irradiation of the original document.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described.

Figure 1:
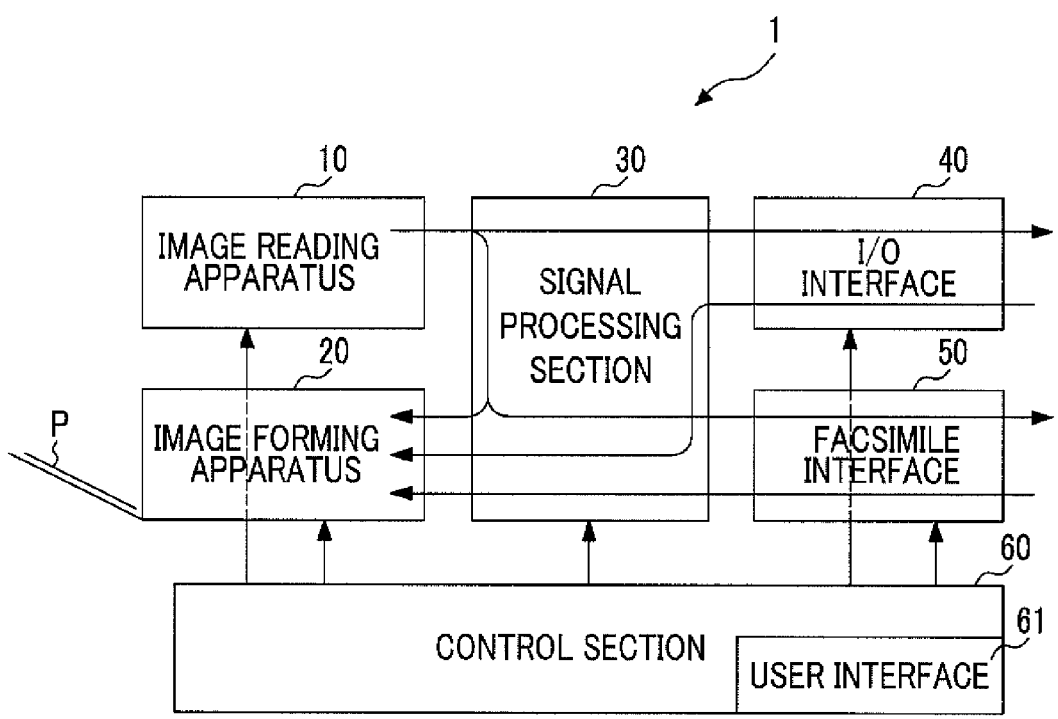
FIG. 1 is a block diagram illustrating a multifunction machine that includes an image reading apparatus and an image forming apparatus according to an exemplary embodiment of the invention.

FIG. 1 is a block diagram illustrating a multifunction machine that includes an image reading apparatus and an image forming apparatus according to an exemplary embodiment of the invention.

A multifunction machine 1 includes an image reading apparatus 10 and an image forming apparatus 20.

The image reading apparatus 10 reads an image on an original document to generate an image signal. The image signal is input to a signal processing section 30 to be described later, and is subject to various kinds of signal processing. When the original document on which the image to be read is recorded is transported on a transport path passing through a reading position and passes through the reading position, the image reading apparatus 10 reads the image on the original document. Details thereof will be described later.

Further, the image forming apparatus 20 forms an image on a sheet P based on the image signal. The sheet P on which the image is formed is output from the image forming apparatus 20. In this description, a so-called electro-photographic image forming apparatus is considered as the image forming apparatus 20, but alternatively, other types of image forming apparatuses such as an inkjet image forming apparatus may be used.

The image formed on the sheet P in the image forming apparatus 20 is not necessarily based on the image signal obtained by reading the image on the original document in the image reading apparatus 10, as described below, and may be based on an image signal input from the outside.

The multifunction machine 1 includes the signal processing section 30. The signal processing section 30 performs various kinds of signal processing for the image signal obtained by the image reading apparatus 10 or the image signal input from the outside, according to a mode of the image signal.

Further, the multifunction machine 1 includes an I/O interface 40 and a facsimile interface 50.

The I/O interface 40 performs communication between the multifunction machine 1 and an image editing apparatus (not shown) that is typically configured by a computer. The I/O interface 40 receives an image signal obtained by the image reading apparatus 10 through the signal processing section 30, and transmits the obtained image signal to the image editing apparatus. In this case, the multifunction machine 1 functions as a scanner. Further, the I/O interface 40 receives an image signal transmitted from the image editing apparatus. The image signal received by the I/O interface 40 is transmitted to the image forming apparatus 20 through the signal processing section 30. The image forming apparatus 20 forms an image on a sheet based on the transmitted image signal. In this case, the multifunction machine 1 functions as a printer.

Further, the facsimile interface 50 is a module that is connected to a telephone line and functions as a facsimile machine. That is, in a facsimile transmission mode, in the image reading apparatus 10, the original document on which an image for facsimile transmission is written is read to generate an image signal, and the generated image signal is transmitted to a receiver through the signal processing section 30 and the facsimile interface 50 on a telephone line. Further, in a facsimile reception mode, an image signal transmitted through the telephone line is received by the facsimile interface 50, and is input to the image forming apparatus 20 through the signal processing section 30. The image forming apparatus 20 prints out an image on a sheet based on the input image signal.

Further, the multifunction machine 1 has a copy function. In a copy mode, an image signal obtained by reading the original document by the image reading apparatus 10 is input to the image forming apparatus 20 through the signal processing section 30, and an image based on the input image signal is printed out onto a sheet in the image forming apparatus 20.

Further, the multifunction machine 1 includes a control section 60. The control section 60 includes a user interface 61. The control section 60 performs the above-described various functions or mode switching according to a user instruction or the like from the user interface 61, for example, and further performs overall controls necessary for the multifunction machine 1.

Here, the signal processing section 30, the I/O interface 40, the facsimile interface 50 and the control section 60 may be provided in a housing of the image reading apparatus 10, may be provided in a housing of the image forming apparatus 20, or may be provided divided among the housing of the image reading apparatus 10 and in the housing of the image forming apparatus 20. In the example shown in FIG. 4 and the like to be described later, the above components are provided in the housing of the image forming apparatus 20. Here, in the example shown in FIG. 4 and the like, the user interface 61 is provided on an upper surface of the housing of the image forming apparatus 20.

Figure 2:
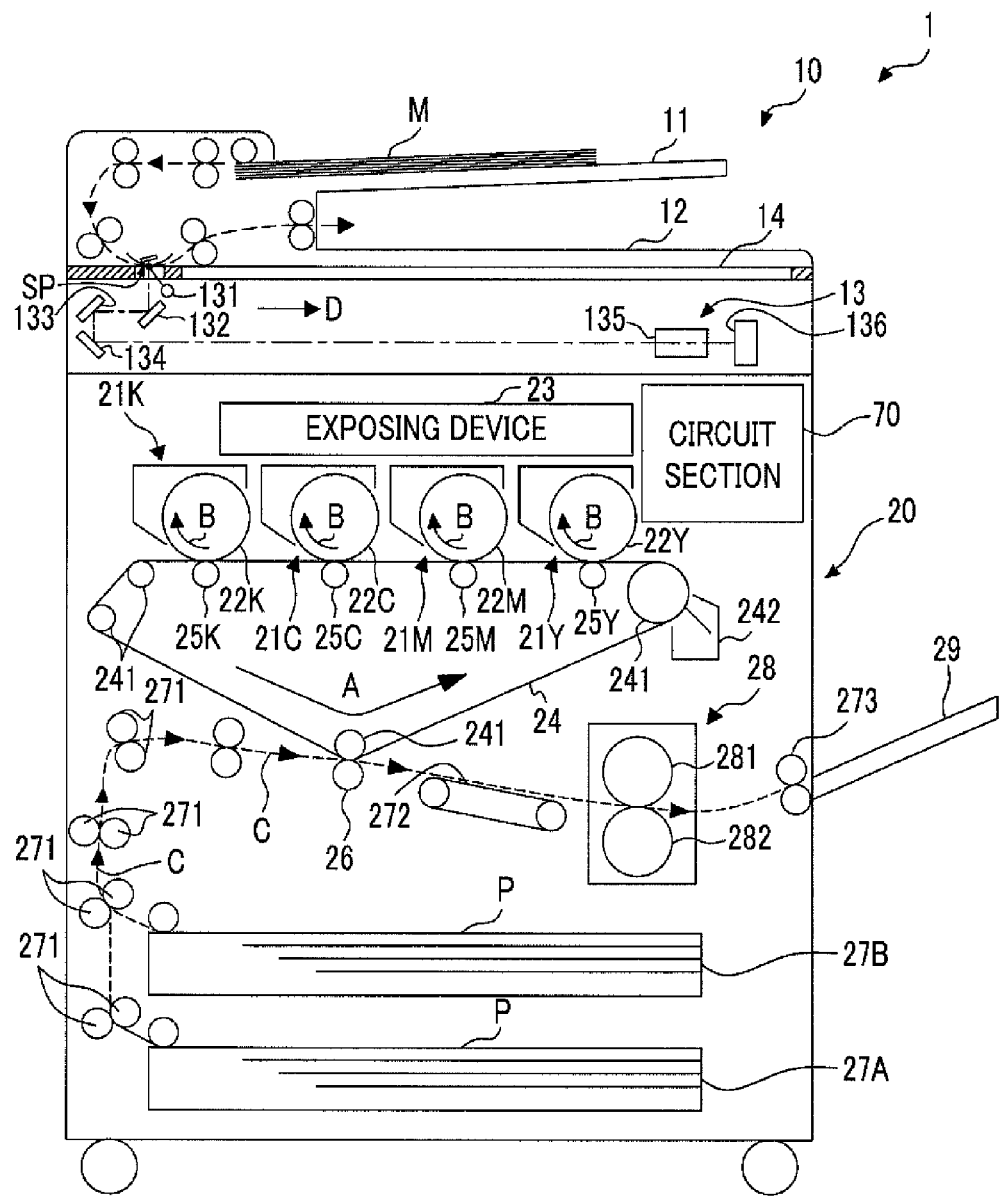
FIG. 2 is a schematic diagram mainly illustrating a mechanical configuration of the multifunction machine shown in the block diagram of FIG. 1.

FIG. 2 is a schematic diagram mainly illustrating a mechanical configuration of the multifunction machine shown in the block diagram of FIG. 1.

FIG. 2 shows a configuration of the image reading apparatus 10 and the image forming apparatus 20 in the multifunction machine 1 shown in FIG. 1. The other components shown in FIG. 1 (the signal processing section 30, the I/O interface 40, the facsimile interface 50 and the control section 60) are shown as a circuit section 70, which is indicated as a single block. However, the user interface 61 will be separately described with reference to FIG. 4. The image reading apparatus 10 has a transport reading mode and a stationary reading mode, as a reading mode where an image on the original document is read.

In the transport reading mode, an original document M placed on a document tray 11 is transported sheet by sheet on a transport path indicated by a dashed line according to a user operation, and passes through a reading position SP. An image recorded on the original document is illuminated by a lamp 131 when passing through the reading position SP, and its reflected light is guided to a reading sensor 136 through reflecting mirrors 132, 133 and 134 and a lens 135 that form a reading optical system and is read by the reading sensor 136 to generate an image signal. In the present exemplary embodiment, a light receiving unit 13 is configured by the reading optical system including the reflecting mirrors 132, 133 and 134 and the lens 135, and the reading sensor 136. The original document M that passes through the reading position SP is output onto a document output tray 12. Details about a transport section that transports the original document M will be described later.

Further, the image reading apparatus 10 is provided with a transparent glass plate 14 on which one sheet of the original document is placed. Further, the image reading apparatus 10 has a structure in which a hinge that laterally extends is provided on a rear side in a direction perpendicular to the page face of FIG. 2 and a front side is lifted so that an upper part of the transparent glass plate 14 is empty.

In the stationary reading mode, the upper part is lifted, and one sheet of the original document M is placed face-down on the transparent glass plate 14, so that the original document is interposed between the transparent glass plate 14 and a lower surface of the document output tray 12. In this state, if reading is started by a user operation, the lamp 131 and the mirrors 132 to 134 move in a direction of arrow D along a lower surface of the transparent glass plate 14, and an image on the original document is read by the reading sensor 136 to generate an image signal.

Next, an outline of the image forming apparatus 20 will be described.

The image forming apparatus 20 is an apparatus that forms an image on a sheet P by a so-called electro-photographic method.

The image forming apparatus 20 is provided with image forming units 21K, 21C, 21M and 21Y that form toner images using toners of respective colors of black (K), cyan (C), magenta (M) and yellow (Y).

Hereinafter, when it is not necessary to distinguish the respective colors, signs of only numbers will be used for description, without using suffixes of K, C, M and Y indicating colors.

The respective image forming units 21 are provided with respective photoconductors 22 of an electro-photographic type, which rotate in a direction of arrow 13. Each photoconductor 22 is charged by a charging unit (not shown), and receives irradiation of exposure light from an exposing device 23, so that an electrostatic latent image is formed in each photoconductor 22. The electrostatic latent image is developed by a toner in a developing unit (not shown), so that a toner image of each color is formed on each photoconductor 22.

Further, an intermediate image transfer belt 24 that is arranged along an array of the photoconductors 22, is supported under tension by rollers 241, and circularly moves in a direction of arrow A is provided under the respective image forming units 21. Further, each primary transfer roller 25 is arranged at a position that faces each photoconductor 22 with the intermediate image transfer belt 24 interposed therebetween.

The toner images of the respective colors formed on the respective photoconductors 22 are transferred to sequentially overlap on the intermediate image transfer belt 24 by operations of the respective primary transfer rollers 25.

A cleaner (not shown) that cleans a region of the photoconductor 22 after the transfer is provided in each image forming unit 21, and the surface of each photoconductor 22 is cleaned by the cleaner.

Further, the image forming apparatus 20 is provided with a secondary transfer roller 26, in which a toner image obtained by the transfer and sequential overlap on the intermediate image transfer belt 24 is transferred onto the transported sheet P.

In a lower part of the image forming apparatus 20, a first tray 27A and a second tray 273 that accommodate sheets are provided. In the transfer of the toner image onto the sheet P, one sheet P is extracted from either one of the sheet trays 27A or 278 and is transported in a direction of arrow C by transport rollers 271, and then, the toner image on the intermediate image transfer belt 24 is transferred onto the sheet P when the sheet P passes through the position of the secondary transfer roller 26. The sheet P to which the toner image is transferred is transported by a transport belt 272 to pass through a fixing unit 28. The fixing unit 28 includes a heating roller 281 and a pressure roller 282, heats and pressurizes the sheet P carrying the non-fixed transported toner image interposed between the heating roller 281 and the pressure roller 282, and thus, the non-fixed toner image on the sheet P is fixed onto the sheet P. The sheet P on which an image formed by the fixed toner image is printed is output onto an output tray 29 by output rollers 273.

After the toner image on the intermediate image transfer belt 24 is transferred onto the sheet P by an operation of the secondary transfer roller 26, a surface of the intermediate image transfer belt 24 is cleaned by a cleaner 242.

Figure 3:
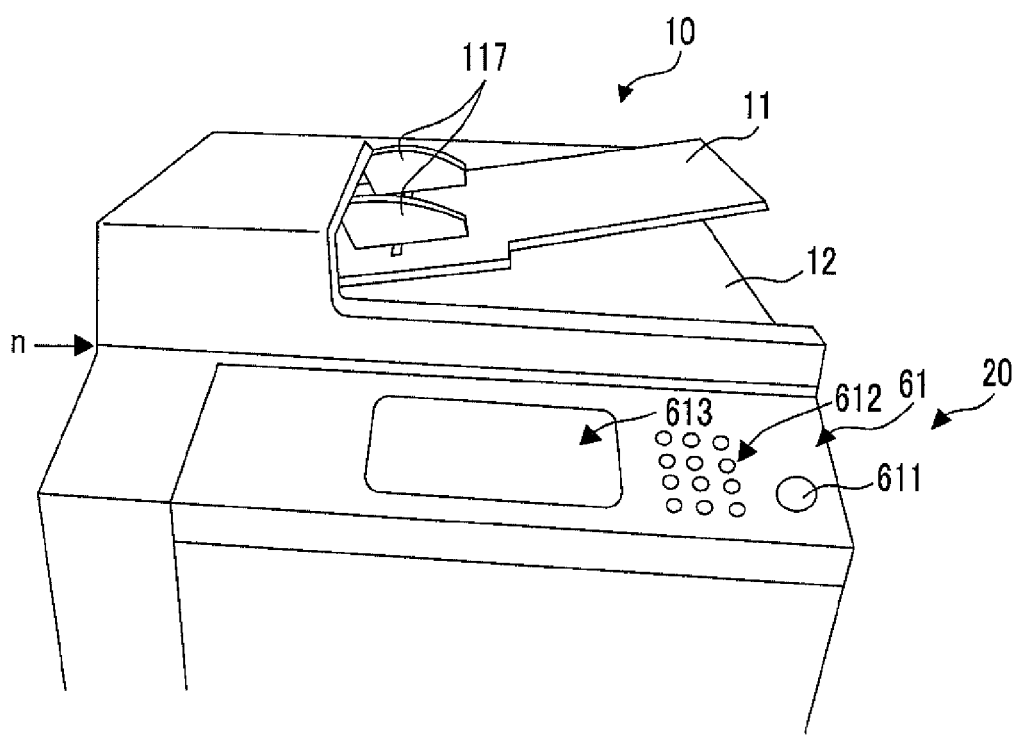
FIG. 3 is a perspective view illustrating an external upper part of the multifunction machine shown in FIG. 2.

FIG. 3 is a perspective view illustrating an external upper part of the multifunction machine shown in FIG. 2.

In FIG. 3, an external appearance of upper portions of the image reading apparatus 10 and the image forming apparatus 20 is shown.

In the image reading apparatus 10 shown in FIG. 3, the document tray 11 and the document output tray 12 shown in FIG. 2 are shown. Further, in FIG. 3, a position regulating member 117 that regulates the position, in a width direction, of the original document placed on the document tray 11 is also shown. As described above, the image reading apparatus 10 has a structure in which an upper part with reference to line n shown in FIG. 3 is lifted by the hinge on the rear side. In this lifted state, the original document is placed to face down on the transparent glass plate 14 (see FIG. 2), and then, the lifted upper part is closed as shown in FIG. 3. Then, a start button 611 is pushed. Then, in the image reading apparatus 10, an image on the original document is read in the above-described stationary reading mode.

Further, in the upper part of the image forming apparatus 20 shown in FIG. 3, the user interface 61 (also see FIG. 1) is shown.

The user interface 61 shown in FIG. 3 includes the start button 611, a numeric keypad 612, and a touch panel 613 that serves as a display.

If the start button 611 is pushed, the reading of the original document in the image reading apparatus 10 is started. Further, the number of copies, a facsimile number of a receiver in facsimile transmission, and the like are set by the numeric keypad 612.

Further, in the touch panel 613, various settings are performed according to screens displayed therein.

Figure 4:
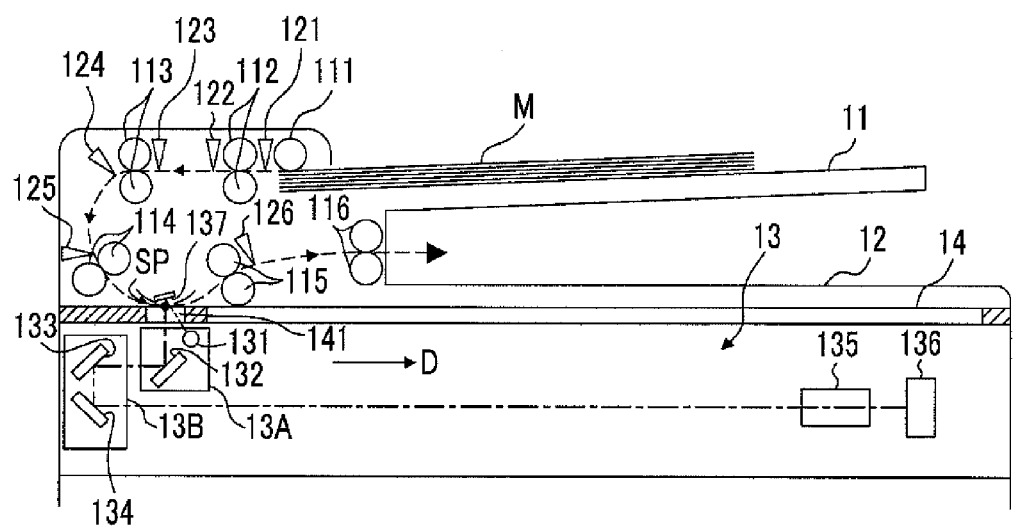
FIG. 4 is a diagram illustrating the image reading apparatus shown in FIGS. 1 and 2.
Figure 5:
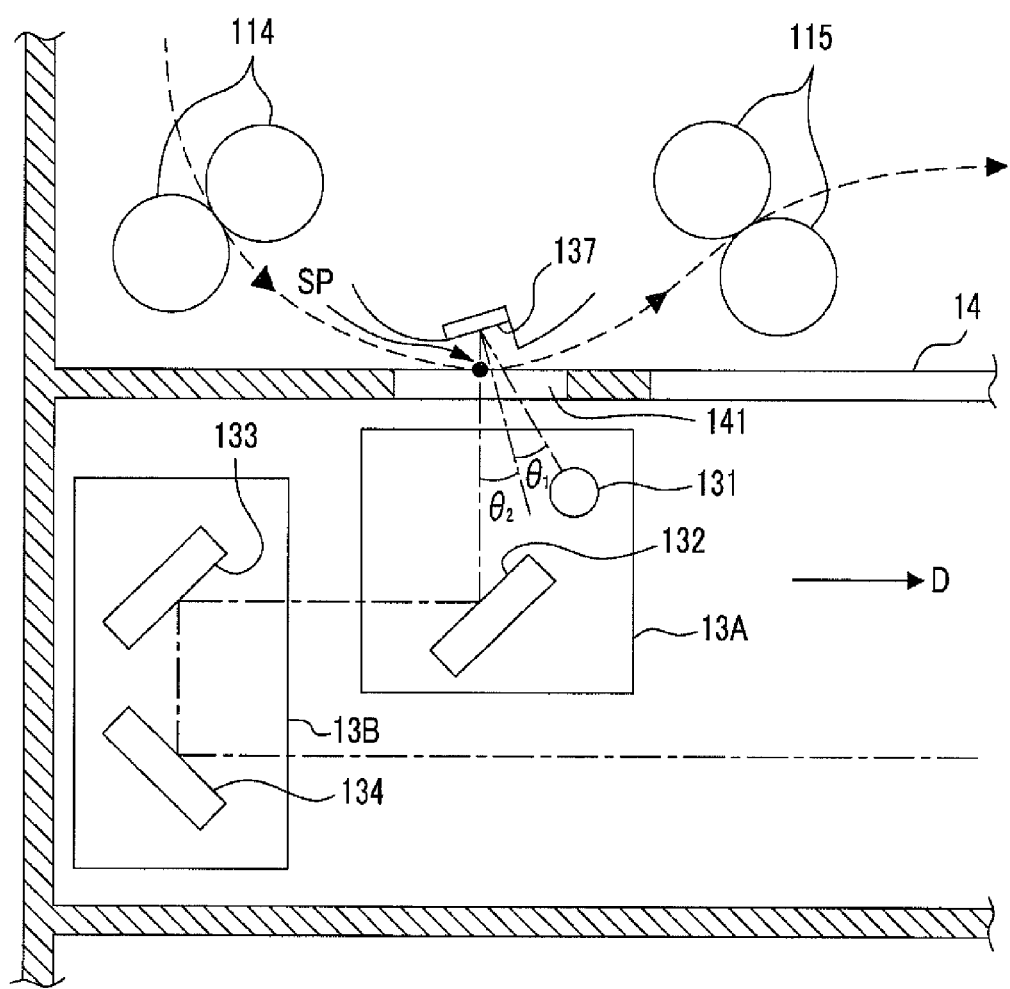
FIG. 5 is a partially enlarged view of the image reading apparatus shown in FIG. 4.

FIG. 4 is a diagram illustrating the image reading apparatus shown in FIGS. 1 and 2. Further, FIG. 5 is a partially enlarged view of the image reading apparatus shown in FIG. 4.

The original document M placed on the document tray 11 is transported sheet by sheet on a transport path passing through the reading position SP and is output onto the document output tray 12.

As a transport member that transports, the original document M, a first roller 111, second rollers 112, third rollers 113, fourth rollers 114, fifth rollers 115 and sixth rollers 116 are shown in FIG. 4. Further, as a sensor that detects the presence or absence of the original document transported on the transport path, a first sensor 121, a second sensor 122, a third sensor 123, a fourth sensor 124, a fifth sensor 125 and a sixth sensor 126 are shown.

A function of correcting the inclination of the original document M is provided in the transport path. Here, when the document inclination correction function is used, sound is generated compared with a case where the function is not used. Thus, in the image reading apparatus 10, whether the document inclination correction function is used or not may be separately handled. Here, assuming that the document inclination correction function is used, the function will be described.

The first roller 111 is a roller that sends one sheet among plural sheets of the original document M placed on the document tray 11 onto the transport path. When a leading edge of the original document M sent by the first roller 111 reaches the second rollers 112, the second rollers 112 are stopped without being rotated, and thus, the leading edge of the sent original document M is bent by being in contact with the second rollers 112. Thus, when the original document is sent in a state of being inclined in a lateral direction, the inclination is corrected. Then, the second rollers 112 are rotated, and thus, the original document M is further transported. However, the original document M is bent again by being in contact with the third rollers 113, and thus, the inclination of the original document is corrected again. Then, the original document M is further sent by the third rollers 113, but the original document M is transported in a state where a slight bending remains between the second rollers 112 and the third rollers 113 so that the original document M is not under tension by a speed difference of the second rollers 112 and the third rollers 113. The original document transported by the third rollers 113 is further transported to the fourth rollers 114, and then passes through the reading position SP. At the reading position SP, the original document M is transported in the state of being in contact with an upper surface of a transparent glass plate 141. The transparent glass plate 141 corresponds to an example of a guide member in the invention. The original document M that passes through the reading position SP is further transported by the fifth rollers 115, and is output onto the document output tray 12 by the sixth rollers 116.

The first sensor 121 to the sixth sensor 126 detect the passages of the sent original document M at respective positions where the sensors are arranged, so that a roller rotation start timing, a reading start timing using the reading sensor 136, and the like are adjusted. With respect to the reading start timing using the reading sensor 136, the reading start timing is strictly adjusted in a case where an image inclination correction process on an image signal (to be described later with reference to FIGS. 9A to 9D) is performed. That is, by executing the document inclination correction process described with reference to FIG. 4, it is possible to perform an accurate timing adjustment, compared with a case where the image inclination correction process on the image signal is not performed.

Here, a reflective member 137 is provided on a rear surface side of the original document M that passes through the reading position SP, that is, at a position where the original document M present at the reading position SP is interposed between the reflective member 137 and the lamp 131. The reflective member 137 corresponds to a background member in the invention.

When the original document M passes through the reading position SP, the original document M is irradiated with light emitted from the lamp 131, and its reflected light is incident onto the light receiving unit 13 and is read by the reading sensor 136 to generate an image signal. The light receiving unit 13 in the present exemplary embodiment includes the mirrors 132 to 134, the lens 135, and the reading sensor 136.

Here, the reflective member 137 is provided at an angle different from the original document. Specifically, the reflective member 137 is arranged in the state of being inclined with respect to the original document that passes through the reading position SP so that a difference between an incident angle $\theta_1$ of light emitted from the lamp 131 shown in FIG. 5 and a reflection angle $\theta_2$ of the reflected light toward the light receiving unit 13 is smaller than a difference between an incident angle and a reflection angle with respect to the original document M that passes through the reading position SP. In the present exemplary embodiment, more specifically, the reflective member 137 is arranged in the state of being inclined so that the incident angle $\theta_1$ and the reflection angle $\theta_2$ with respect to the reflective member 137 are approximately the same.

The reading sensor 136 starts reading immediately before the original document M reaches the reading position SP. Accordingly, immediately after the reading starts, the reflected light from the reflective member 137 is read. When the original document M is read, a portion of the original document M where the strongest light is expected to be reflected corresponds to a white portion where nothing is recorded. In particular, in many cases, the edges of the original document M correspond to the white portion where nothing is recorded. The intensity of light received by the light receiving unit 13 is digitalized, and is displayed with 255 level grayscale, but at this time, the light reflected from the white portion of the original document is designed with approximately 210 level grayscale. Here, since the reflective member 137 is arranged in the state of being inclined so that the incident angle $\theta_1$ and the reflection angle $\theta_2$ are approximately the same, as described above, light that is stronger than that in the white portion of the original document M where nothing is recorded is read. Accordingly, in the image signal, pixel values are changed in the leading edge of the original document M. In the present exemplary embodiment, a straight line indicating the leading edge of the original document M is recognized based on the change in the pixel values.

The lamp 131 and the first mirror 132 are assembled in a first carriage 13A, and the second mirror 133 and the third mirror 134 are assembled in a second carriage 13B. Here, the lamp 131 and the first mirror 132 respectively correspond to a light source and a light receiving unit in the invention.

Here, in the transport reading mode, that is, in the mode where the original document M is placed on the document tray 11, is sent and transported by the first roller 111, and is read at the reading position SP, the first carriage 13A and the second carriage 13B are in a stop state at respective stop positions shown in FIGS. 4 and 5. In this state, the original document M transported to the reading position SP is irradiated by the lamp 131, and its reflected light is read by the reading sensor 136. In contrast, in the stationary reading mode, the original document is placed to face down on the transparent glass plate 14, and the first carriage 13A and the second carriage 13B move along a lower surface of the transparent glass plate 14 in a sub-scanning direction, that is, in a direction of arrow D. Here, the second carriage 13B moves at a speed of ½ of a movement speed of the first carriage 13A. Thus, the length of an optical path to the lens 135, of the reflected light reflected by the original document placed on the transparent glass plate 14, is constantly maintained, and an image on the original document is correctly formed on the reading sensor 136.

Figure 6:
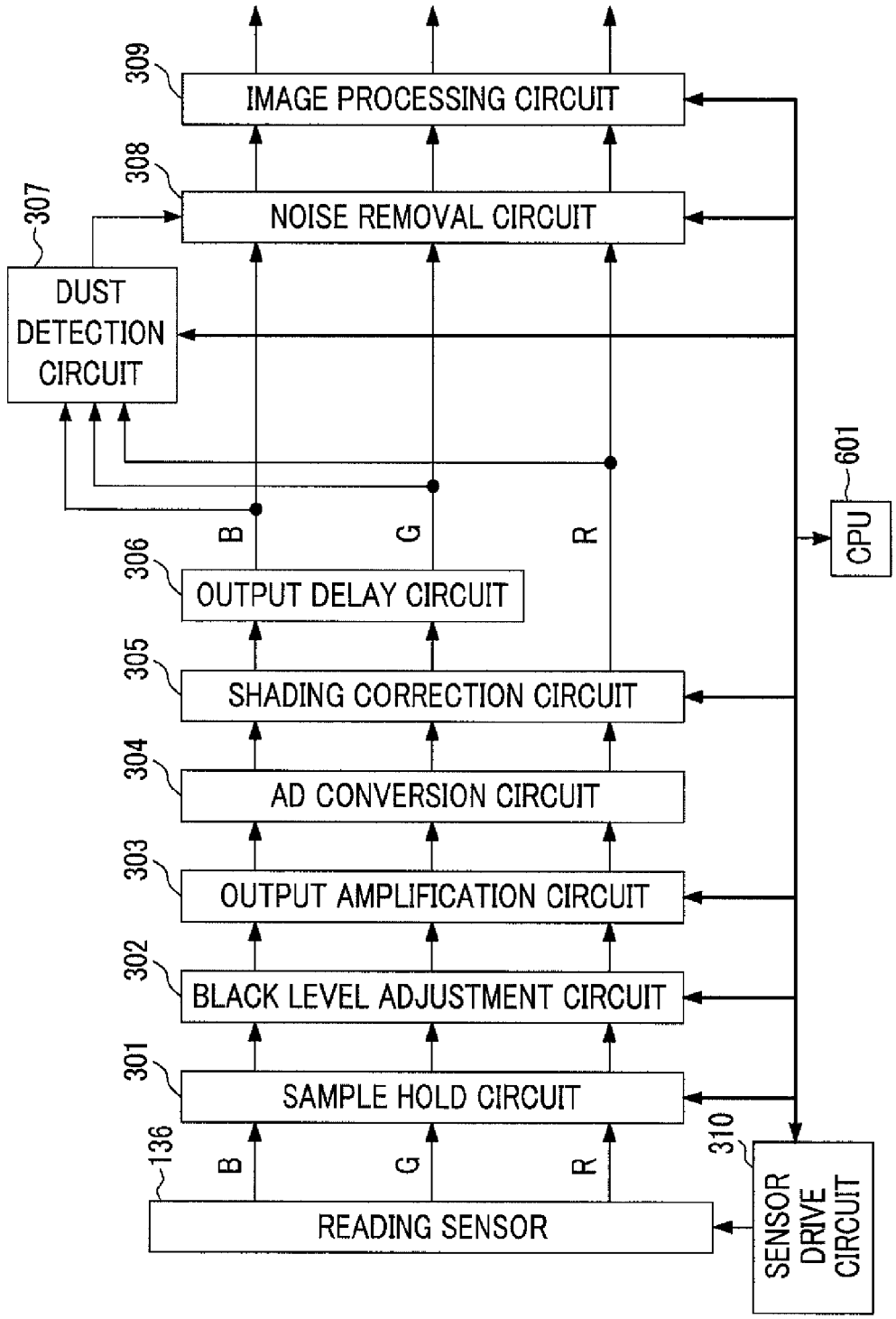
FIG. 6 is a block diagram illustrating a section that processes an image signal obtained by a reading sensor, in an image processing section shown in FIG. 1.

FIG. 6 is a block diagram illustrating a section that processes an image signal obtained by the reading of the reading sensor, in the image processing section shown in FIG. 1.

The image signal obtained by the document reading in the reading sensor 136 shown in FIG. 4 is processed as shown in FIG. 6.

Processes shown in FIG. 6 are executed under the control of a CPU 601 that forms the control section 60 shown in FIG. 1.

The reading sensor 136 is driven by a sensor drive circuit 310 to generate an image signal for each spectroscopic image of B (blue), G (green) and R (red). Each image signal of the B, G and R is input to a sample hold circuit 301 to be sample-held for each pixel. The signal sample-held in the sample hold circuit 301 is input to a black level adjustment circuit 302. The black level adjustment circuit 302 is a circuit that removes a signal offset to adjust a black level. After the black level is adjusted in the black level adjustment circuit 302, the signal is amplified to a signal having a level suitable for AD conversion in an AD conversion circuit 304, in an output amplification circuit 303. Then, the signal is converted into a digital image signal by the AD conversion circuit 304. Then, shading correction is performed by a shading correction circuit 305. The shading correction is a process of correcting light intensity unevenness of the lamp 131 (see FIG. 2, FIG. 3 or the like) in a main scanning direction (a direction perpendicular to the page face of FIG. 2, FIG. 3 or the like), ambient light intensity reduction of the lens 135, or the like. Among the image signals of B, G and R output from the shading correction circuit 305, the image signals of B and G are input to an output delay circuit 306, and are subject to a delay process to match with the image signal of R in timing. In the reading sensor 136, sensors of B, G and R are not present at the same position in the sub scanning direction, and image signals delayed in the order of B, G and R are generated. For this reason, the output delay circuit 306 delays the image signals of B and G to match with the image signal of R in timing.

The image signal of R output from the shading correction circuit 305 and the image signals of B and G output from the shading correction circuit 305 and delayed by the output delay circuit 306 are input to a dust detection circuit 307 and a noise removal circuit 308. The dust detection circuit 307 detects the presence or absence of dust attached to the transparent glass plate 141 (see FIGS. 4 and 5), and detects, when the dust is present, the position of the dust in the main scanning direction. The detection result in the dust detection circuit 307 is input to the noise removal circuit 308.

The noise removal circuit 308 executes a process of removing a vertical stripe generated in the image signal due to the detected dust. Specifically, the noise removal circuit 308 executes a process of replacing values of pixels on the vertical stripe with an average value of the pixels on both sides of the vertical stripe.

After the removal of the vertical stripe due to the dust is performed by the noise removal circuit 308 in this way, the image signal is input to an image processing circuit 309. The image processing circuit 309 executes various kinds of image processing according to operation modes of the image forming apparatus 20 shown in FIG. 1. After the image processing in the image processing circuit 309, the image signal is transmitted to a transmission destination according to the operation mode.

Figure 7:
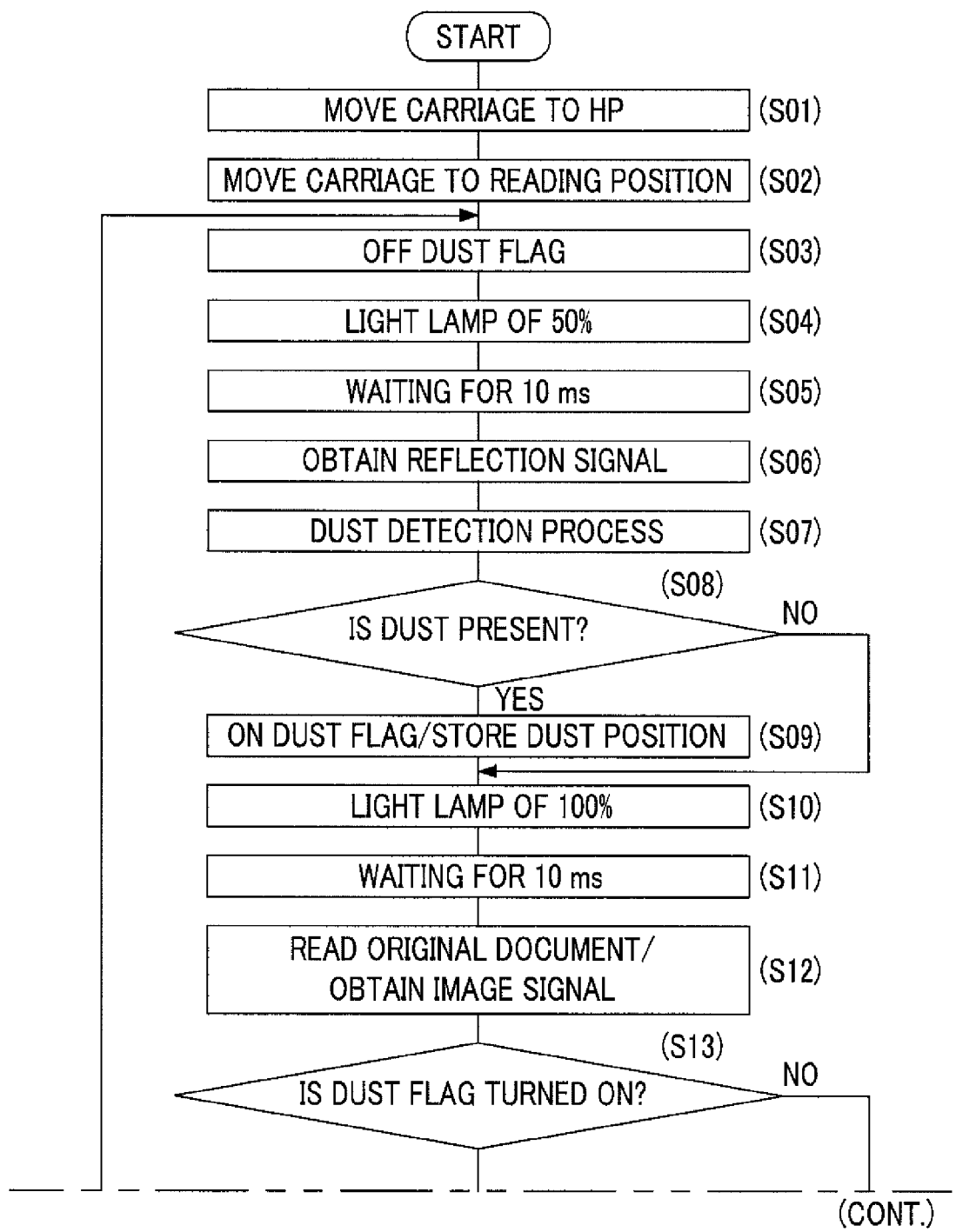
FIG. 7 is a flowchart illustrating an operation flow of the image reading apparatus in document reading.

FIG. 7 is a flowchart illustrating an operation flow of the image reading apparatus in the document reading. FIG. 7 shows an operation flow in the transport reading mode where the original document is read while being transported.

If the original document is placed on the document tray 11 and the start button 611 is pushed, an operation based on the operation flow shown in FIG. 7 is started.

If the process in FIG. 7 is started, first, a carriage is moved to a home position (HP) (step S01). Here, in the present exemplary embodiment, the carriage as shown in FIGS. 3 and 4 includes the first carriage 13A and the second carriage 13B, but if the first carriage 13A moves, the second carriage 13B also moves to a position according to the movement position of the first carriage 13A in accordance with the movement of the first carriage 13A to constantly maintain the length of the optical path. Accordingly, here, the first carriage 13A and the second carriage 13B will be simply referred to as the carriage, without specific distinction.

A sensor is provided at the home position, and detects that the carriage is present at the home position. If the carriage moves using the home position as a start point, a movement distance is measured using the amount of rotation of a motor that moves the carriage, and a current position of the carriage is recognized from the movement distance.

After the carriage moves to the home position, the carriage moves to the reading position shown in FIGS. 4 and 5 (step S02). If the carriage moves to the reading position, a dust flag in the dust detection circuit 307 (see FIG. 6) is reset to be off as a dust detection preparation (step S03). Further, the lamp 131 (see FIGS. 3 and 4) is lighted with the intensity of light weakened to 50%, for example, with respect to the intensity of light in the document reading (step S04). The adjustment of the intensity of light to 50% may be performed by suppressing voltage or electric current supplied to the lamp 131, or may be reducing a duty cycle of turning on and off, according to the lamp 131.

After the lamp 131 is lighted with the intensity of light of 50%, and after waiting for 10 ms that is the time for which the intensity of light is substantially stable (step S05), the light reflected from the reflective member 137 shown in FIGS. 3 and 4 is read by the reading sensor 136 to obtain a reflection signal. The reflection signal is subject to the processes shown in FIG. 6, and is input to the dust detection circuit 307. In the dust detection circuit 307, the dust detection process is executed based on the reflection signal (step S07), and when the dust is present (step S08), the dust flag is set to be on, and the position of the dust in the main scanning direction is stored (step S09).

Figure 8:
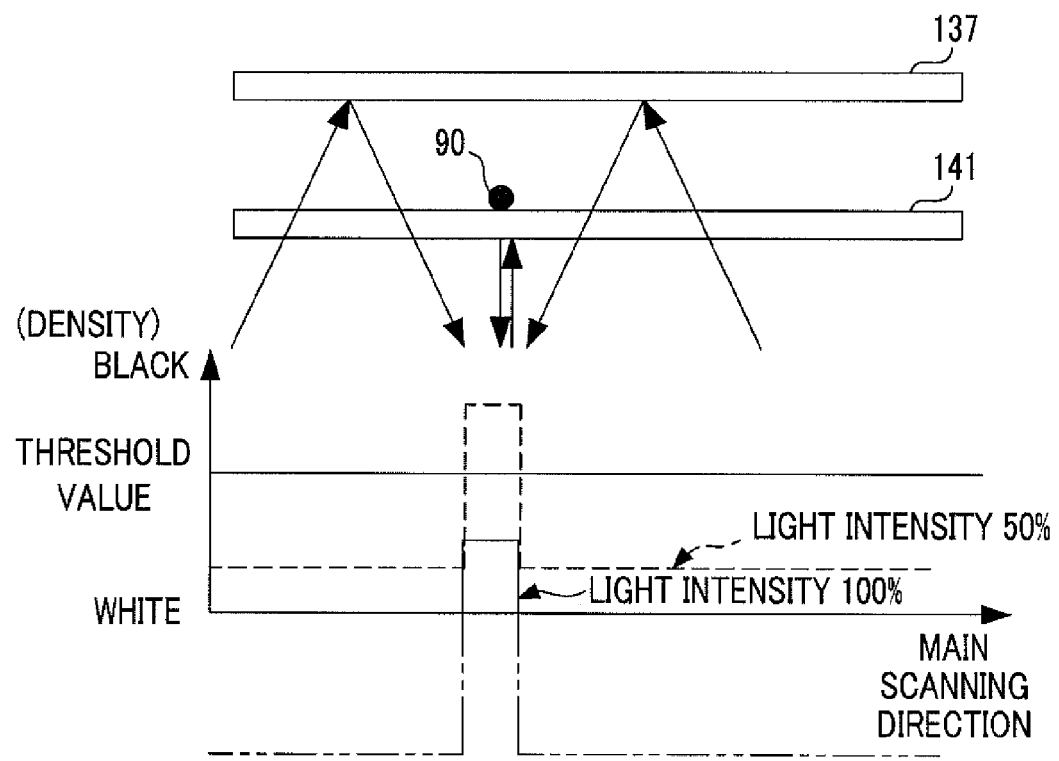
FIG. 8 is a diagram illustrating a dust detection process based on a reflection signal.

FIG. 8 is a diagram illustrating the dust detection process based on the reflection signal.

The horizontal axis in FIG. 8 represents the main scanning direction, and the vertical axis represents a pixel value (density).

Light emitted from the lamp 131 (see FIGS. 4 and 5) passes through the transparent glass plate 141, is reflected from the reflective member 137, and is read by the reading sensor 136 (see FIG. 4). Here, if dust 90 is attached, a pixel value of a density closer to black corresponding to the portion of the dust is obtained. Here, a signal line indicated by a two-dot chain line below a "white" line represents the intensity of light of the reflected light when the lamp 131 is lighted with the intensity of light of 100%. Here, in the reading sensor 136, the light is excessively strong to the point of being saturated, and the signal becomes a signal of the "white" line indicated by a solid line, instead of the two-dot chain line. Thus, even with respect to the point of the dust 90, only a small signal that is slightly close to "black" appears.

In contrast, a signal line indicated by a dashed line shown in FIG. 8 represents a signal line when the lamp is lighted with the intensity of light of 50%. In even a portion where dust is not present, a slightly gray-colored signal appears instead of the complete "white", and in a portion where the dust is attached, a signal of a level considerably close to "black" appears. The gray-colored signal line approximately coincides with a signal level obtained by reading a white background original document. In other words, the intensity of light of the lamp 131 is weakened to the level that approximately coincides with the above signal level. In the example shown herein, in the signal when the intensity of light is 100%, the dust does not reach a threshold value, and thus, it is determined that the dust is not present. In contrast, here, since the intensity of light is reduced, the signal level indicated by the dashed line is obtained, and the dust portion exceeds the threshold value to be close to "black". Thus, it is detected that the dust is present.

Returning to FIG. 7, the description will be continued.

In step S10, the lamp is lighted with the intensity of light of 100% set for the document reading, and the waiting time of 10 ms elapses until the lamp is stable (step S11).

Then, the original document is transported, and the original document is read to obtain an image signal (step S12).

Here, the original document is transported with or without the execution of the document inclination correction operation according to its operation mode or the like, as described with reference to FIG. 4. When the document inclination correction operation is not executed, the image inclination correction process on an image signal to be described later is executed. The image signal obtained by the document reading is subjected to the processes shown in FIG. 6, and is input to the dust detection circuit 307 and the noise removal circuit 308.

Then, it is determined whether the dust flag is on (step S13). If the dust flag is on, that is, if the presence of the dust is confirmed based on the reflected light before the document reading, the presence of the vertical stripe at the same position as the position in the main scanning direction where the dust is detected on the image obtained by the document reading is detected (step S14).

If it is determined that the dust flag is on in step S13 and it is determined that the vertical stripe is present at the same position as that of the dust in step S15, a noise removal process is executed by the noise removal circuit 308 of FIG. 6 (step S16). In the noise removal process, as described above, the pixel values of the pixels on the vertical stripe is replaced with the average value of the pixels on both sides of the vertical stripe.

Here, in step S13, if it is determined that the dust flag is off, the noise removal process in step S16 is not performed. This is because if the noise removal process is performed, image quality may be deteriorated to some degree. Further, while the dust is not present, it is possible to avoid the execution of the process.

Here, in FIG. 8, an example in which the dust 90 is attached to the transparent glass plate 141 is shown, but even when the dust is attached to the reflective member 137, it is possible to obtain the same signal as in FIG. 8, and to detect the presence of the dust.

However, since the original document passes through a space between the transparent glass plate 141 and the reflective member 137, when the dust is attached to the reflective member 137, the vertical stripe does not appear on the image when the original document is read. Alternatively, even though the dust is attached to the transparent glass plate 141, the dust is extruded outside the reading position in accordance with the transport of the original document, and consequently, the vertical stripe may not appear. In this case, if the noise removal process is performed, the image quality is deteriorated to that extent. Accordingly, even though the dust flag is on, when it is detected that the vertical stripe is not detected, the noise removal process is not performed.

After the noise removal process (step S16) is performed, or if it is determined that the dust flag is off (step S13) or the vertical stripe is not present (step S15), in the image processing circuit 309 shown in FIG. 6, image processing except for the noise removal process is performed (step S17). Here, the image processing is changed according to the operation mode or the like, and includes the image inclination correction process as one of the image processing performed herein.

The image reading apparatus 10 of the multifunction machine 1 has the function of correcting the inclination of the original document that is being transported, as described with reference to FIG. 4. However, when the function is performed, since sound is generated, compared with a case where the function is not performed, whether the document inclination correction function is used or not is separately handled according to the operation mode or the like.

Here, there is a risk that when the original document is read without using the original document inclination correction function, the image on the original document is read in a state where the original document is inclined to generate an image signal indicating an image in the state of being inclined. Thus, in the present exemplary embodiment, the process of correcting the inclination of the image based on the image signal is provided. Here, the noise removal process (step S16) executed in the noise removal circuit 308 is performed before the image inclination correction process in the image processing circuit 309 to remove the vertical stripe on the image in a state where the original document is read before the inclination correction is performed.

Hereinafter, an outline of the image inclination correction process will be described.

The image signal obtained by the document reading in the image reading apparatus 10 includes the image recorded in the original document, and a boundary line between the original document itself and the background outside the original document, that is, information on the edges of the original document. Here, first, based on the information on the edges of the original document included in the input image signal, the leading edge of the original document in the transport direction is detected. After the leading edge of the original document is detected, the amount of inclination of the original document is calculated. Then, after the amount of inclination of the original document is calculated, the inclination of the image indicated by the image signal is corrected to generate a new image signal indicating the image of which the inclination is corrected.

FIGS. 9A to 9D are diagrams illustrating a processing content of the image inclination correction process.

Here, first, a straight line indicating the leading edge of the original document and an inclination angle of the straight line are calculated by a Hough transform. Then, the image on the original document is rotated in the image signal by an amount corresponding to the amount of inclination, by a rotation process included in an Affine transform, to generate a new image signal indicating an image without inclination.

The Hough transform and the Affine transform are known computation techniques, and thus, only an outline thereof will be described herein.

Figure 9A:
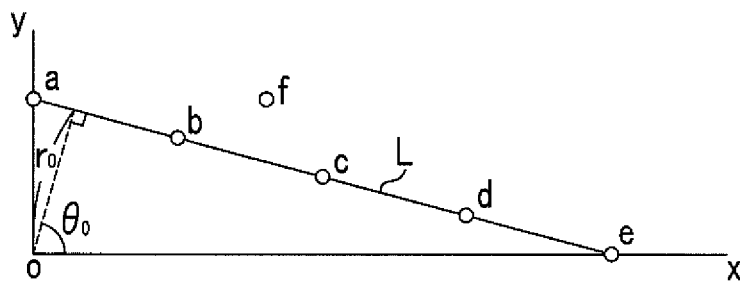
FIGS. 9A to 9D are diagrams illustrating a processing content of an image inclination correction process.
Figure 9B:
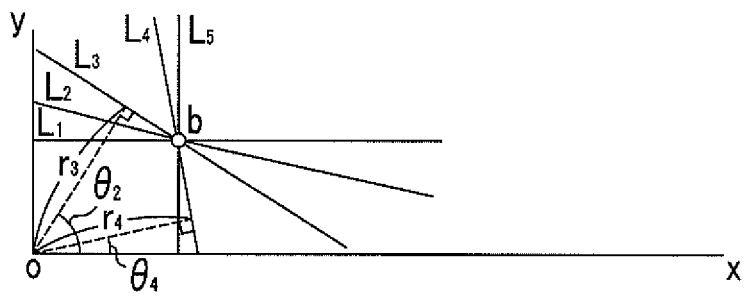
Figure 9C:
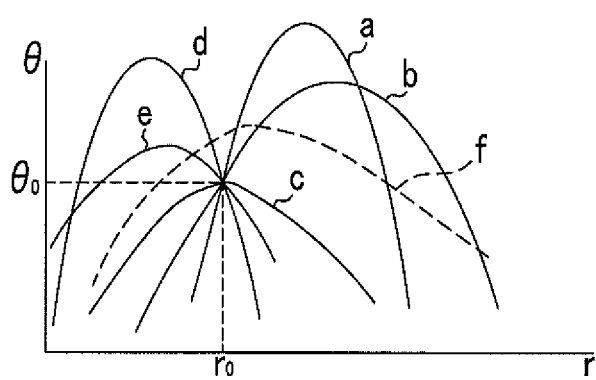

FIGS. 9A to 9C are diagrams illustrating the Hough transform.

As described above, the original document is transported on the transport path that passes through the reading position, and the image on the original document is read while the original document passes through the reading position to generate the image signal. The image signal includes the information on the edges of the original document.

The horizontal axis x in FIG. 9A represents the position of the original document in the width direction, and the vertical axis y represents the transport direction of the original document.

A straight line L shown in FIG. 9A represents a straight line indicating the leading edge of the original document obtained as the image signal. Here, since the straight line is not yet obvious, it is assumed that points a to f expected to be present on the leading edge of the original document are extracted from the obtained image signal. These points a to f include plural points (here, the points a to e) present on the straight line L indicating the leading edge of the original document, and also include an error point (here, expressed as the point f).

When the length of a perpendicular line extending to the straight line from an original point O is r and its inclination is $\theta$, the straight line is expressed as $r = x \cos\theta + y \sin\theta$ ... (1). As shown in FIG. 9A, if $r=r_0$, $\theta=\theta_0$ ... (2), the straight line L shown in FIG. 9A is uniquely determined.

The Hough transform is a computation method for calculating $(r, \theta) = (r_0, \theta_0)$.

FIG. 9B is a diagram illustrating various straight lines (here, represented as five straight lines $L_1$ to $L_5$) passing through the point b with reference to only one point b in FIG. 9A.

Respective perpendicular lines extend to the respective straight lines $L_1$ to $L_5$ from the original point O, and the lengths of the perpendicular lines are represented as $r_i$, and angles thereof are represented as $\theta_i$ (i=1, ..., 5). FIG. 9B shows lengths $r_3$ and $r_4$ and angles $\theta_3$ and $\theta_4$ with respect to two straight lines $L_3$ and $L_4$.

FIG. 9C is a diagram illustrating a Hough space formed by the lengths r (horizontal axis) and the angles $\theta$ (vertical axis) of the perpendicular lines.

If the lengths r and the angles $\theta$ of the lines perpendicular to the plural straight lines passing through the point b shown in FIG. 9B are plotted, a sine wave curve shown in a graph b shown in FIG. 9C is obtained. The curve of the graph b represents a straight line group passing through the point b.

If graphs formed by the lengths r and the angles $\theta$ of the perpendicular lines are similarly calculated with respect to all the points a to f, in addition to the point b shown in FIG. 9A, graphs a to f shown in FIG. 9C are obtained.

Here, the points (here, the points a to e) that are correctly present on the leading edge of the original document pass through a certain point $(r_0, \theta_0)$ in the Hough space shown in FIG. 9C, but a graph f indicating the straight line group passing through the error point (here, the point f) is represented as a curve that does not pass through the point $(r_0, \theta_0)$ In this way, by extracting the plural points expected to be present on the leading edge of the original document in the image signal in order to calculate the plural graphs as shown in FIG. 9C, and by finding one point where the plural graphs are focused, it is possible to obtain $(r_0, \theta_0)$ specifying the straight line L shown in FIG. 9A.

Here, the straight line L indicating the leading edge of the original document is recognized by the Hough transform based on the image signal.

Figure 9D:
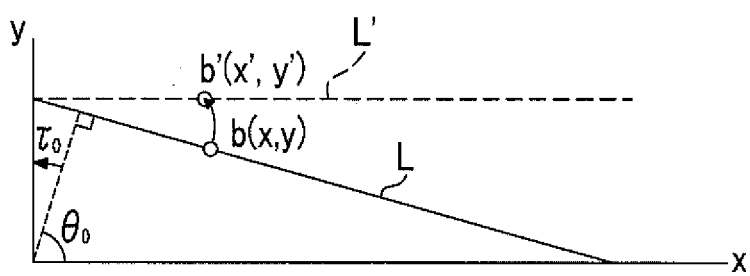

FIG. 9D also shows the straight line L indicating the leading edge of the original document.

In this stage, the straight line L is already uniquely determined by the Hough transform described with reference to FIGS. 9A to 9C. That is, the angle $\theta_0$ is fixed.

Here, using the angle $\theta_0$, an inclination angle $\tau_0$ of the straight line L, that is, the amount of inclination of the original document is calculated by computation of $\tau_0 = 90° - \theta_0$ ... (3).

Further, a process of calculating a straight line L' with no inclination by rotating the straight line L is performed.

That is, when coordinates of a point (herein, represented as the point b) on the straight line L are (x, y), new coordinates (x', y') obtained by rotating the point b by $\tau_0$ are expressed as follows.

$$x' = x \cos\tau_0 - y \sin\tau_0$$

$$y' = x \sin\tau_0 + y \cos\tau_0 \quad (4)$$

Here, coordinates of all pixels that form the image indicated by the image signal are converted according to the above expression (4). Thus, the image signal indicating the inclined image obtained by being read in a state where the original document is inclined is converted into a new image signal indicating an image read in a state where the original document is not inclined.

In the present exemplary embodiment, the image inclination correction process and the original document inclination correction operation described with reference to FIG. 4 may be selectively executed according to the operation modes.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a light source that irradiates an original document that passes through a reading position with light;
a light receiving unit that receives reflected light from the original document;
a background member that is inclined at an angle such that there is: (i) a first difference between a first incident angle of light incident on the background member from the light source and a first reflection angle of light reflected from the background member to the light receiving unit when the original document is not present at the reading position, (ii) a second difference between a second incident angle of light incident on the original document present at the reading position and a second reflection angle of light reflected to the light receiving unit from the original document present at the reading position, when the original document at the reading position is interposed between the background member and the light source, and (iii) the first difference is smaller than the second difference; and
a foreign substance detecting section that detects, when the original document is not present at the reading position, a foreign substance present at the reading position based on a result obtained by irradiating the background member with light having a light intensity lower than the intensity of the light for irradiation of the original document.

2. The image reading apparatus according to claim 1, further comprising:
a guide member that guides a surface of the original document that passes through the reading position, the surface facing the light source, regulates a position of the surface, and passes the incident light from the light source and the reflected light to the light receiving unit,
wherein the foreign substance detecting section detects a foreign substance attached to the guide member to be distinguished from a foreign substance attached to the background member, based on both of an image signal generated in a state where the original document is not present at the reading position and an image signal generated by receiving the reflected light from the original document passing through the reading position.

3. The image reading apparatus according to claim 2, further comprising:
an image correcting section that corrects an image defect due to the foreign substance detected by the foreign substance detecting section, which appears on the image signal generated by receiving the reflected light from the original document passing through the reading position, to generate a new image signal.

4. The image reading apparatus according to claim 1, further comprising:
an image correcting section that corrects an image defect due to the foreign substance detected by the foreign substance detecting section, which appears on an image signal generated by receiving the reflected light from the original document passing through the reading position, to generate a new image signal.

5. An image reading apparatus comprising:
a transport member that transports an original document on which an image is formed to pass through a reading position;
a light source that irradiates the original document passing through the reading position with light;
a light receiving unit that receives the light emitted from the light source and reflected from the reading position;
a background member that is disposed at a position where the original document present at the reading position is interposed between the background member and the light source, reflects the light emitted from the light source toward the light receiving unit in a state where the original document is not present at the reading position, and is placed to be inclined with respect to the original document passing through the reading position in a direction where a first difference between a first incident angle of the light incident on background member emitted from the light source and a first reflection angle of light reflected from the background member to the light receiving unit is smaller than a second difference between a second incident angle of light incident on the original document and a second reflection angle of light reflected to the light receiving unit from the original document passing through the reading position; and
a foreign substance detecting section that causes, in a state where the original document is not present at the reading position, the light source to irradiate the background member with light having a light intensity lower than the intensity of light for irradiation of the original document passing through the reading position, causes the light receiving unit to receive the reflected light from the background member, and detects a foreign substance present at the reading position based on an image signal obtained by the light reception.

6. The image reading apparatus according to claim 5, further comprising:
a guide member that guides a surface of the original document that passes through the reading position, the surface facing the light source, regulates a position of the surface, and passes the incident light from the light source and the reflected light to the light receiving unit,
wherein the foreign substance detecting section detects a foreign substance attached to the guide member to be distinguished from a foreign substance attached to the background member, based on both of an image signal generated in a state where the original document is not present at the reading position and an image signal generated by receiving the reflected light from the original document passing through the reading position.

7. The image reading apparatus according to claim 6, further comprising:
an image correcting section that corrects an image defect due to the foreign substance detected by the foreign substance detecting section, which appears on the image signal generated by receiving the reflected light from the original document passing through the reading position, to generate a new image signal.

8. The image reading apparatus according to claim 5, further comprising:

an image correcting section that corrects an image defect due to the foreign substance detected by the foreign substance detecting section, which appears on an image signal generated by receiving the reflected light from the original document passing through the reading position, to generate a new image signal.

9. An image forming apparatus comprising:

an image reading unit that reads an image from an original document on which the image is formed to generate an image signal; and an image forming unit that forms an image on a sheet based on the image signal generated by the image reading unit, wherein the image reading unit includes:

a transport member that transports the original document on which the image is formed to pass through a reading position;

a light source that irradiates the original document passing through the reading position with light;

a light receiving unit that receives the light emitted from the light source and reflected from the reading position;

a background member that is disposed at a position where the original document present at the reading position is interposed between the background member and the light source, reflects the light emitted from the light source toward the light receiving unit in a state where the original document is not present at the reading position, and is placed to be inclined with respect to the original document passing through the reading position in a direction where a first difference between an incident angle of light incident on the background member from the light source and a first reflection angle of light reflected from the background member to the light receiving unit is smaller than a second difference between a second incident angle of light incident on the original document and a second reflection angle of light reflected to the light receiving unit from the original document passing through the reading position; and a foreign substance detecting section that causes, in a state where the original document is not present at the reading position, the light source to irradiate the background member with light having a light intensity lower than the intensity of light for irradiation of the original document passing through the reading position, causes the light receiving unit to receive the reflected light from the background member, and detects a foreign substance present at the reading position based on an image signal obtained by the light reception.

* * * * *